(12) United States Patent
Ward et al.

(10) Patent No.: US 12,281,244 B2
(45) Date of Patent: Apr. 22, 2025

(54) BIO-BASED REACTIVE POLYURETHANE HOTMELT ADHESIVES

(71) Applicant: Henkel AG & Co. KGaA, Duesseldorf (DE)

(72) Inventors: James Ward, Duesseldorf (DE); Christian Holtgrewe, Duesseldorf (DE); Timo Pasemann, Oberhausen (DE); Anja Cosima Lindhorst, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 698 days.

(21) Appl. No.: 17/176,745

(22) Filed: Feb. 16, 2021

(65) Prior Publication Data

US 2021/0163801 A1 Jun. 3, 2021

Related U.S. Application Data

(63) Continuation of application No. PCT/EP2019/063432, filed on May 24, 2019.

(30) Foreign Application Priority Data

Aug. 28, 2018 (EP) .................................... 18191144

(51) Int. Cl.
| | | |
|---|---|---|
| C09J 175/06 | (2006.01) | |
| C08G 18/12 | (2006.01) | |
| C08G 18/30 | (2006.01) | |
| C08G 18/40 | (2006.01) | |
| C08G 18/42 | (2006.01) | |
| C08G 18/48 | (2006.01) | |
| C08G 18/62 | (2006.01) | |
| C08G 18/76 | (2006.01) | |
| C09J 7/35 | (2018.01) | |
| C09J 175/08 | (2006.01) | |
| C08L 75/06 | (2006.01) | |

(52) U.S. Cl.
CPC ............ *C09J 175/06* (2013.01); *C08G 18/12* (2013.01); *C08G 18/302* (2013.01); *C08G 18/307* (2013.01); *C08G 18/4063* (2013.01); *C08G 18/4202* (2013.01); *C08G 18/4845* (2013.01); *C08G 18/6225* (2013.01); *C08G 18/7657* (2013.01); *C09J 7/35* (2018.01); *C09J 175/08* (2013.01); *C08G 18/4018* (2013.01); *C08G 18/4808* (2013.01); *C08G 2170/20* (2013.01); *C08L 75/06* (2013.01); *C09J 2301/306* (2020.08); *C09J 2475/00* (2013.01)

(58) Field of Classification Search
None
See application file for complete search history.

(56) References Cited

U.S. PATENT DOCUMENTS

| 3,164,572 A * | 1/1965 | Axelrood ........... C08G 18/6674 |
| | | 528/61 |
| 4,774,313 A * | 9/1988 | Tazewell ............ C08G 18/4804 |
| | | 521/914 |
| 5,021,507 A | 6/1991 | Stanley et al. |
| 8,933,163 B2 | 1/2015 | Krebs et al. |
| 2006/0106167 A1* | 5/2006 | Shah .................. C08G 18/6662 |
| | | 525/123 |
| 2013/0267637 A1 | 10/2013 | Varkey et al. |
| 2014/0242396 A1* | 8/2014 | Kanagawa ............. C09J 175/06 |
| | | 525/440.07 |
| 2015/0322314 A1 | 11/2015 | Franken et al. |
| 2016/0046845 A1 | 2/2016 | Das et al. |
| 2016/0046846 A1* | 2/2016 | Das .................... C08G 18/2081 |
| | | 428/423.1 |
| 2018/0237671 A1* | 8/2018 | Das .................... C08G 18/4216 |
| 2019/0264078 A1* | 8/2019 | Xie ........................ C08G 18/36 |
| 2022/0049103 A1* | 2/2022 | Kambe ................ C09D 11/037 |

FOREIGN PATENT DOCUMENTS

| CN | 108285766 | * | 7/2018 |
| EP | 2621981 B1 | | 11/2017 |
| JP | 2013216750 A | | 10/2013 |
| WO | 2018086029 A1 | | 5/2018 |
| WO | 2019120934 A1 | | 6/2019 |

OTHER PUBLICATIONS

Yu; A New Route for the Synthesis of Propylene Oxide from Bio-Glycerol Derivated Propylene Glycol; Chem Communications, 2009 pp. 3934-3936. (Year: 2009).*
Croda; Shaping the Oleochemical Future in Coatings & Adhesives; (2008) pp. 1-4. (Year: 2008).*
International Search Report for International PCT Patent Application No. PCT/EP2019/063432 dated Jun. 24, 2019.

* cited by examiner

*Primary Examiner* — David J Buttner
(74) *Attorney, Agent, or Firm* — Sun Hee Lehmann

(57) ABSTRACT

The present invention relates to a moisture curable hotmelt adhesive composition comprising at least one polyurethane prepolymer obtained from the reaction of a) at least one polyether; b) at least one (meth)acrylic resin; c) at least one crystalline polyester; d) at least one amorphous polyester; e) at least one isocyanate compound; in a presence of a catalyst, wherein at least one of said polyether, crystalline polyester and amorphous polyester is partially or completely bio-based material.

19 Claims, 1 Drawing Sheet

BIO-BASED REACTIVE POLYURETHANE HOTMELT ADHESIVES

TECHNICAL FIELD OF THE INVENTION

The present invention relates to polyurethane hotmelt adhesives having from 11 to 61% by weight of the total weight of the adhesive composition material replaced by bio-based material without loss in physical properties and performance.

BACKGROUND OF THE INVENTION

Reactive polyurethane hotmelt adhesives are commonly known. Reactive polyurethane hot melt adhesives are solid at room temperature but, upon application of heat, melt to a liquid or fluid state in which form they are applied to a substrate. During cooling, the hot melt adhesive regains its solid form. The solid form, which is formed upon cooling the adhesive imparts all of the cohesion—strength, toughness, creep and heat resistance to the final adhesive.

Reactive polyurethane adhesives consist primarily of isocyanate terminated polyurethane prepolymers that react with surface or ambient moisture in order to chain-extend, forming a new polyurethane polymer. These polyurethane prepolymers are traditionally produced using petrol-based raw materials. To increase sustainability, the end users of the reactive polyurethane adhesives are now requesting products with increased bio-based content without compromising performance.

However, it is not straightforward task to change petrol-based polyurethane prepolymers by bio-based polyurethane prepolymers having identical chemical structure in a reactive polyurethane hotmelt adhesive for example. Most of the cases it is nearly impossible to find identical bio-based raw-material to be used to form a polyurethane prepolymer, and therefore, one must compromise with close alternatives. However, quite often, the close alternatives having a slightly different chemical structure provide very different physical properties—higher/lower melting point, higher/lower viscosity, solid vs. liquid etc. Therefore, the close alternative bio-based polyurethane prepolymers do not necessary behave the same way in the composition as the original petrol-based polyurethane prepolymers. Small changes in the chemical formulation may change for example completely the solidification behaviour of the adhesive composition or change the fixture and impact performance of the adhesive composition.

Therefore, there is a need for reactive polyurethane adhesives obtained from increased quantities of bio-based raw material without losing desired physical properties and performance.

SUMMARY OF THE INVENTION

Figure 1:
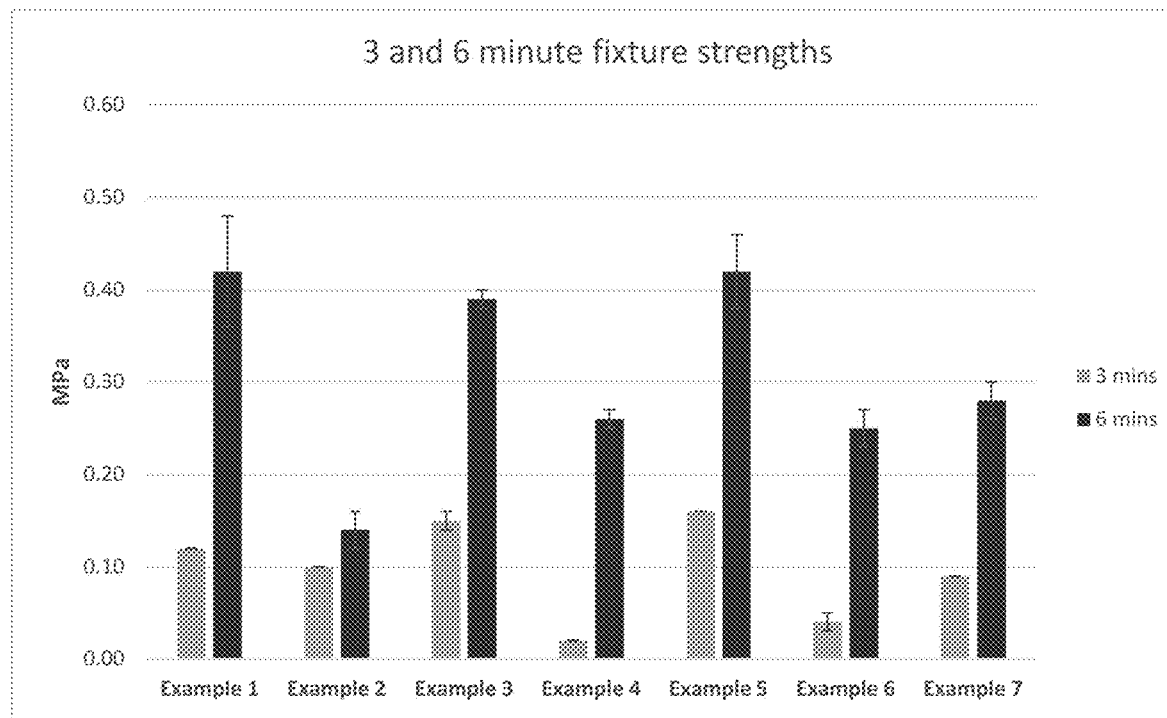
FIG. 1 illustrates three- and six-minutes fixture strengths.

The present invention relates to a moisture curable hotmelt adhesive composition comprising at least one polyurethane prepolymer obtained from the reaction of a) at least one polyether; b) at least one (meth)acrylic resin; c) at least one crystalline polyester; d) at least one amorphous polyester; e) at least one isocyanate compound; in a presence of a catalyst, wherein at least one of said polyether, crystalline polyester and amorphous polyester is partially or completely bio-based material.

The present invention also relates to a cured moisture curable hotmelt adhesive composition according to the present invention.

The present invention also encompasses use of a moisture curable hotmelt adhesive composition according to the present invention as structural adhesives in electronic devices, preferably in cover glass bonding, battery bonding, general module bonding and computer peripherals.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

All percentages, parts, proportions and then like mentioned herein are based on weight unless otherwise indicated.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in disclosing the invention, including technical and scientific terms, have the meaning as commonly understood by one of the ordinary skill in the art to which this invention belongs to. By means of further guidance, term definitions are included to better appreciate the teaching of the present invention.

By the term "bio-based" is meant herein a raw material, which is derived from the renewable sources (and is not petrol based). However, it is noted that the term does not refer to the production process of the materials, only to the source where they are derived from. ASTM D 6866 for example is used to determine the bio-based content of the materials.

The present invention relates to a moisture curable hotmelt adhesive composition comprising at least one polyurethane prepolymer obtained from the reaction of a) at least one polyether; b) at least one (meth)acrylic resin; c) at least one crystalline polyester; d) at least one amorphous polyester; e) at least one isocyanate compound; in a presence of a catalyst, wherein at least one of said polyether, crystalline polyester and amorphous polyester is partially or completely bio-based material.

A moisture curable hotmelt adhesive composition according to the present invention comprises a bio-based material from 11 to 61% by weight of the total weight of the adhesive composition, preferably from 11 to 59%.

The polyurethane prepolymer according to the present invention is obtained from the reaction of a) at least one polyether; b) at least one (meth)acrylic resin; c) at least one crystalline polyester; d) at least one amorphous polyester; e) at least one isocyanate compound; in a presence of a catalyst.

Suitable polyethers for use in the present invention are polyether polyols produced from low molecular weight polyfunctional alcohols and alkylene oxides having 2-6 carbon atoms. For example, reaction products between ethylene glycol, propylene glycol, isomeric butanediols, hexanediols and ethylene oxide, propylene oxide, butylene oxide or mixtures thereof are suitable for use in the present invention.

Preferably polyether is polypropylene glycol, more preferably polypropylene glycol having a molecular weight from 1500 to 2500 g/mol and even more preferably polypropylene glycol having molecular weight about 2000 g/mol. The molecular weight is measured by gel permeation chromatography according to DIN 55672-1:2007-08 with THF as the eluent.

Example of commercially available polyether for use in the present invention is but not limited to PPG 2000 from Dow.

A moisture curable hotmelt adhesive composition according to the present invention comprises a polyether from 18 to 24% by weight of the total weight of the composition, preferably from 19 to 23%, more preferably from 20 to 22% and even more preferably about 21%.

According to the present invention, the petrol-based polyether can be replaced partially or completely by bio-based polyether. From 50% to 100% by weight of the weight of the petrol-based polyether can be replaced by bio-based polyether without moisture curable hotmelt adhesive according to the present invention losing its desired physical properties and physical performance.

According to the present invention petrol-based polyether can be replaced by bio-based polyether polyol made from 1,3-propanediol. Preferably bio-based poly-1,3-propanediol is used as a replacement.

In a highly preferred embodiment, bio-based poly-1,3-propanediol having a molecular weight from 1900 to 2100 g/mol is used. The molecular weight is measured by gel permeation chromatography according to DIN 55672-1:2007-08 with THF as the eluent.

Examples of commercially available bio-based polyether polyol for use in the present invention is but not limited to Velvetol H2000 from Alessa GmbH.

Suitable (meth)acrylic resin for use in the present invention is formed from two or more (meth)acrylate monomers. Suitable (meth)acrylate monomers are selected from the group consisting of methylmethacrylate, n-butylmethacrylate, methacrylic acid, isobutylmethacrylate, isobornylmethacrylate, acrylamide, methylacrylate and mixtures thereof, preferably suitable (meth)acrylate monomers are selected from isobutylmethacrylate, isobornylmethacrylate, acrylamide, methylacrylate and mixtures thereof, more preferably (meth)acrylic resin is a mixture of isobutylmethacrylate, isobornylmethacrylate, acrylamide and methylacrylate monomers.

Suitable (meth)acrylic resin for use in the present invention has preferably a molecular weight (Mn) from 8000 to 30000 g/mol, wherein molecular weight is measured by gel permeation chromatography according to DIN 55672-1:2007-08 with THF as the eluent.

This molecular weight is preferred because there is no benefit for strength using a higher molecular weight, and furthermore, higher molecular weight may hinder jetting stability.

Example of commercially available (meth)acrylic resin for use in the present invention is but not limited to Dianal MB 2595 from DAI Dianal America Inc.

A moisture curable hotmelt adhesive composition according to the present invention comprises a (meth)acrylic resin from 18 to 24% by weight of the total weight of the composition, preferably from 19 to 23%, more preferably from 20 to 22% and even more preferably about 21%.

This quantity range is preferred because lower quantities may decrease open time and viscosity and increase impact resistance, whereas higher quantities may increase viscosity.

Suitable crystalline polyesters for use in the present invention are polyesters formed from aliphatic diacids and aliphatic diols. Suitable diacids have linear 4-14 carbon atom chain, preferably diacids have linear 6 or 12 carbon atom chains. Whereas, suitable diols have linear 2-8 carbon atom chain, preferably diol has linear 6 carbon atom chain.

In one preferred embodiment, crystalline polyester is formed from hexanedioic acid and 1,6-hexanediol and has a molecular weight about 3500 g/mol, wherein molecular weight is measured by gel permeation chromatography according to DIN 55672-1:2007-08 with THF as the eluent.

Examples of commercially available crystalline polyesters for use in the present invention are but not limited to Dynacoll 7360 and Dynacoll 7380 from Evonik.

A moisture curable hotmelt adhesive composition according to the present invention comprises a crystalline polyester from 23 to 29% by weight of the total weight of the composition, preferably from 24 to 28%, more preferably from 25 to 27% and even more preferably about 26%.

The petrol-based crystalline polyester can be replaced partially by bio-based crystalline polyester. According to the present invention from 50% to 75% by weight of the weight of the petrol-based crystalline polyester can be replaced by bio-based crystalline polyester without moisture curable hotmelt adhesive according to the present invention losing its desired physical properties and performance.

According to the present invention petrol-based crystalline polyester can be replaced for example by bio-based crystalline polyester made from decanedioic acid and 1,2-propanediol or bio-based crystalline polyester made from decanedioic acid and 1,4-butanediol or bio-based crystalline polyester made from butanedioc acid and 1,4-butanediol.

Example of commercially available bio-based crystalline polyester for use in the present invention is but not limited to Dynacoll Terra EP481.01 from Evonik.

In one embodiment, the moisture curable hotmelt adhesive composition according to the present invention comprises 20% by weight of the total weight of the composition of bio-based crystalline polyester formed from decanedioic acid and 1,2-propanediol and 6% by weight of the total weight of the composition petrol based crystalline polyester formed from decanedioic acid and 1,2-propanediol.

Suitable amorphous polyester polyols for use in the present invention are amorphous polyester polyols prepared from polycarboxylic acids, their anhydrides, their esters or their halides, and a stoichiometric excess of polyhydric alcohol.

Suitable polycarboxylic acids for use in the present invention to form amorphous polyester polyols are dicarboxylic acids and tricarboxylic acids including, aromatic dicarboxylic acids, anhydrides and esters, aliphatic dicarboxylic acids and anhydrides and alicyclic dicarboxylic acids. Examples of suitable acids and anhydrides are terephthalic acid, isophthalic acid, dimethyl terephthalate, diethyl terephthalate, phthalic acid, phthalic anhydride, methyl-hexahydrophthalic acid, methyl-hexahydrophthalic anhydride, methyl-tetrahydroplithalic acid, methyl-tetrahydrophthalic anhydride, hexahydrophthalic acid, hexahydrophthalic anhydride, and tetrahydrophthalic acid, maleic acid, maleic anhydride, succinic acid, succinic anhydride, glutaric acid, glutaric anhydride, adipic acid, pimelic acid, suberic acid, azelaic acid, sebacic acid, chlorendic acid, 1,2,4-butanetricarboxylic acid, decanedicarboxylic acid, octadecanedicarboxylic acid, dimeric acid, dimerized fatty acids, trimeric fatty acids, fumaric acid, 1,3-cyclohexanedicarboxylic acid, 1,4-cyclohexanedicarboxylic acid and mixtures thereof.

Suitable polyhydric alcohols for use in the present invention to form amorphous polyester polyols are aliphatic polyols, aromatic polyols, aliphatic diols and aromatic diols. Examples of suitable polyhydric alcohols are ethylene glycols, 1,2-propanediol, 1,3-propanediol, 1,2-butanediol, 1,3-butanediol, 1,4-butanediol, 1,3-butenediol, 1,4-butenediol, 1,4-butynediol, 1,5-pentanediol, 1,6-hexanediol, 1,8-octanediol, 1,10-decanediol, neopentyl glycol, diethylene glycol, triethylene glycol, tetraethylene glycol, polyethylene glycols, propylene glycol, dipropylene glycol, tripropylene glycol, 1,4-cyclohexanedimethanol, 1,4-cyclohexanediol, dimer diols, glycerol, polytetramethylene ether glycol, 3-methyl-1,5-pentanediol, 1,9-nonanediol, 2-methyl-1,8-octanediol, trimethylolpropane, pentaerythritol, sorbitol, glucose, hydrogenated bisphenol A, and hydrogenated bisphenol F, bisphenol A and bisphenol F and mixtures thereof.

In one embodiment amorphous polyester polyol may have a chemical structure I:

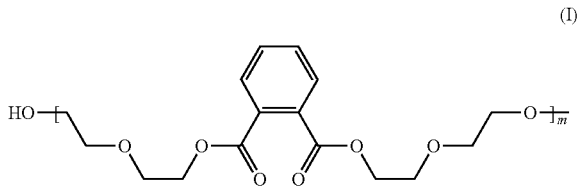

(I)

wherein m is an integer 4-10.

Particularly preferred amorphous polyester for use in the present invention is diethylene glycol-phthalic anhydride-based modified polyester polyol.

Example of commercially available amorphous polyester for use in the present invention is but not limited to Stepanpol PDP70 from Stepan.

A moisture curable hotmelt adhesive composition according to the present invention comprises an amorphous polyester from 14 to 20% by weight of the total weight of the composition, preferably from 15 to 19%, more preferably from 16 to 18% and even more preferably about 17%.

The petrol-based amorphous polyester can be replaced partially by bio-based amorphous polyester. According to the present invention from 50% to 100% by weight of the weight of the petrol-based amorphous polyester can be replaced by bio-based amorphous polyester without moisture curable hotmelt adhesive according to the present invention losing its desired physical properties and performance.

Petrol-based amorphous polyester can be replaced for example by bio-based amorphous polyester polyols made from dimer fatty acids or dimer diols.

Suitable bio-based amorphous polyester polyol may be formed from a dimer fatty acid, C2-C4 diol, and C8-C16 dicarboxylic acid or C6-C12 lactide.

The dimer fatty acids may be derived from the dimerisation products of C10-C30 fatty acids, especially C18 fatty acids. Thus, the resulting dimer fatty acids may comprise in the range from 20 to 60 and especially 36 carbon atoms.

Suitable diol may be straight chain aliphatic diol or branched aliphatic diol, or a mixture thereof. Examples of suitable straight chain aliphatic diols may be ethylene glycol, diethylene glycol, 1,3-propylene glycol (better known as 1,3-propanediol), and 1,4-butanediol. And examples of suitable branched aliphatic diols may be 1,2-propylene glycol, 1,2-butanediol, 2,3-butanediol, and 1,3-butanediol.

Suitable C8-C16 dicarboxylic acid component is a non-dimeric dicarboxylic acid and distinct from the dimer fatty acid. C8-C16 dicarboxylic acids may be aliphatic or aromatic, and said acids include dicarboxylic acids and esters thereof. Examples of suitable dicarboxylic acid may be suberic acid, azelaic acid, decanedioic acid, undecane dicarboxylic acid, dodecanedioic acid, terephthalic acid, (ortho) phthalic acid, isophthalic acid, adipic acid, glutaric acid, succinic acid, pimelic acid, or heptane dicarboxylic acid, phthalic anhydride and mixtures thereof.

C6-C12 lactide may be substituted or unsubstituted lactide. Lactide is understood to refer to the cyclic di-ester of lactic acid. The lactide may be substituted with one or more C1-C6 alkyl groups.

Example of commercially available bio-based amorphous polyester for use in the present invention is but not limited to Priplast 3238 and Priplast 1838 from Croda.

Suitable isocyanate compound for use in the present invention is an aromatic isocyanate compound, preferably linear aromatic isocyanate compound.

Suitable isocyanate compound to be used to form a polyurethane prepolymer according to the present invention is selected from the group consisting of 4,4-diphenylmethane diisocyanate, toluene-2,6-diisocyanate, 3-phenyl-2-ethylenediisocyante, 1,5-naphthalene diisocyanate, 1,8-naphthalene diisocyanate, cumene-2,4-diisocyanate, 4-methoxy-1,3-phenylene diisocyanate, 4-ethoxy-1,3-phenylenediisocyanate, 2,4-diisocyanatodiphenyl ether, 5,6-dimethyl-1,3-phenylenediisocyanate and mixtures thereof, preferably said isocyanate compound is selected from 4,4-diphenylmethane diisocyanate, 1,6-hexamethylenediisocyanate, 1,5-pentamethylenediisocyanate, 1,3-isophoronediisocyanate and mixtures thereof, more preferably said isocyanate compound is 4,4-diphenylmethane diisocyanate.

Example of commercially available isocyanate compound for use in the present invention is but not limited to 4,4-MDI from Covestro.

A moisture curable hotmelt adhesive composition according to the present invention comprises an isocyanate compound from 11 to 17% by weight by the total weight of the composition, preferably from 12 to 16%, more preferably from 13 to 15% and even more preferably about 14%.

Generally, the lower the quantity of an isocyanate compound, the faster the cure speed of the hotmelt adhesive is. However, if the quantity of an isocyanate compound is too low, the hotmelt adhesive may cure too fast, even during the process to produce the hotmelt. On the other hand, if the quantity of an isocyanate compound is too high, the cure speed may slow down.

A polyurethane prepolymer used in the moisture curable hot melt adhesive composition according to the present invention is obtained from the reaction in a presence of a catalyst.

Suitable catalyst used to form a polyurethane prepolymer according to the present invention is selected from the group consisting of 2,2-dimorpholinodiethylether (DMDEE), dimethylcyclohexylamine (DMCHA), benzyldimethyleneamine (BDMA), 1,8-diazabicyclo-(5,40)-undecane, dimethyl piperazine and mixtures thereof, preferably the catalyst is 2,2-dimorpholinodiethylether.

Example of commercially available catalyst for use in the present invention is but not limited to 2,2-dimorpholinodiethylether (DMDEE) from Huntsman.

The catalyst can be present from 0.01 to 5% by weight of the total weight of the composition, preferably from 0.05 to 2% and more preferably from 0.1 to 1%.

If the quantity of a catalyst is less than 0.01%, the cure rate becomes slow. Whereas if the quantity of a catalyst is more than 5%, the hotmelt may cure in a bottle and/or in a syringe when the hotmelt is heated to be dispensed to a substrate.

The polyurethane prepolymer according to the present invention has a molecular weight (Mn) from 2000 to 8000 g/mol. The molecular weight is measured by gel permeation chromatography according to DIN 55672-1:2007-08 with THF as the eluent.

The polyurethane prepolymer according to the present invention has a viscosity from 3000 to 7000 cps, wherein viscosity is measured according to ASTM D3236.

A moisture curable hotmelt adhesive composition according to the present invention may further comprise an additive selected from the group consisting of adhesion promoters, defoamers, optical brighteners, dispensing agents, pigments, viscosity modifiers and mixtures thereof.

Suitable adhesion promoters to be used in the present invention are for example silane compounds such as mercaptopropyltrimethoxysilane, β-(3,4-epoxycyclohexyl)ethyltrimethoxysilane, γ-glycidoxypropyltrimethoxysilane, and 3-acryloxypropyltrimethoxysilane, N-β-(aminoethyl)-γ-aminopropyltrimethoxysilane, bis-(γ-trimethoxysilylpropyl)amine, N-β-(aminoethyl)-gamma-am inopropylmethyldimethoxysilane, tris-(γ-trimethoxylsilyl)isocyanurate and mixtures thereof.

Example of commercially available adhesion promoter for use in the present invention is but not limited to Silquest A189 from Momentive.

The adhesion promoter can be present from 0.1 to 2% by weight of the total weight of the composition, preferably from 0.2 to 1.5%, more preferably from 0.3 to 1.0% and even more preferably from 0.35 to 0.65%.

If the quantity of an adhesion promoter is less than 0.1, it does not provide ideal adhesion strength. On the other hand, quantity more than 2% may not improve the adhesion strength, but just saturate the adhesive composition.

Suitable defoamers to be used in the present invention are for example acrylate copolymers.

Examples of commercially available defoamer for use in the present invention is but not limited to Perenol F40 from BASF.

Defoamer can be present from 0.1 to 2% by weight of the total weight of the composition, preferably from 0.5 to 1.5%, more preferably from 0.75 to 1.25% and even more preferably 1%.

Suitable optical brightener to be used in the present invention is for example 2,5-thiophenediylbis(5-tert-butyl-1,3-benzoxazole).

Example of commercially available optical brightener for use in the present invention is but not limited to Tinopal OB CO from BASF.

Optical brightener can be present from 0.002 to 2% by weight of the total weight of the composition, preferably from 0.003 to 0.1%, more preferably from 0.004 to 0.008% and even more preferably 0.004%.

Suitable dispensing agents to be used in the present invention are for example high molecular weight alkyloamino amides, hydroxy functional carboxylic acid esters and structured acrylate copolymers.

Example of commercially available dispensing agent for use in the present invention is but not limited to Disperbyk series from BYK.

Optical dispensing agent can be present from 0.1 to 2% by weight of the total weight of the composition, preferably from 0.5 to 1.5%, more preferably from 0.75 to 1.25% and even more preferably 1%.

Suitable pigments to be used in the present invention are for example pigment pastes and colour pastes.

Examples of commercially available pigments for use in the present invention are but not limited to example Moltopren Black Paste F and Isopur SA 20035 9111 black from iSL-Chemie.

Pigment can be present from 0.1 to 2% by weight of the total weight of the composition, preferably from 0.5 to 1.5%, more preferably from 0.75 to 1.25% and even more preferably 1%.

Suitable viscosity modifier to be used in the present invention is for example fumed silica.

Example of commercially available viscosity modifier for use in the present invention is but not limited to Aerosil fumed Silicas from Evonik.

Viscosity modifier can be present from 0.1 to 2% by weight of the total weight of the composition, preferably from 0.5 to 1.5%, more preferably from 0.75 to 1.25% and even more preferably 1%.

The present invention relates to a moisture curable hotmelt adhesive composition wherein at least one component of polyether, crystalline polyester and amorphous polyester is partially or completely bio-based material. A moisture curable hotmelt adhesive composition comprises a bio-based material from 11 to 61 by weight of the total weight of the adhesive composition, preferably from 11 to 59%.

In one embodiment at least 50% of said polyether compound is bio-based material.

In another embodiment 50% of said polyether compound is bio-based material.

In one embodiment at least 50% of said polyether compound is bio-based material and at least 50% of said crystalline polyester compound is bio-based material.

In another embodiment 50% of said polyether compound is bio-based material and 50% of said crystalline polyester compound is bio-based material.

In one embodiment at least 50% of said polyether compound is bio-based material and 100% of said amorphous polyester compound is bio-based material.

In another embodiment 50% of said polyether compound is bio-based material and 100% of said amorphous polyester compound is bio-based material.

In one embodiment 100% of said polyether compound is bio-based material and at least 75% of said crystalline polyester compound is bio-based material.

In another embodiment 100% of said polyether compound is bio-based material and 75% of said crystalline polyester compound is bio-based material.

In one embodiment 100% of said polyether compound is bio-based material and at least 75% of said crystalline polyester compound is bio-based material and at least 50% of said amorphous polyester compound is bio-based material.

In another embodiment 100% of said polyether compound is bio-based material and 75% of said crystalline polyester compound is bio-based material and 50% of said amorphous polyester compound is bio-based material.

In one embodiment according to the present invention at least 50% of said polyether compound is bio-based material, or at least 50% of said polyether compound is bio-based material and at least 50% of said crystalline polyester compound is bio-based material, or at least 50% of said polyether compound is bio-based material and 100% of said amorphous polyester compound is bio-based material, or 100% of said polyether compound is bio-based material and at least 75% of said crystalline polyester compound is bio-based material, or 100% of said polyether compound is bio-based material and at least 75% of said crystalline polyester compound is bio-based material and at least 50% of said amorphous polyester compound is bio-based material.

In another embodiment according to the present invention 50% of said polyether compound is bio-based material, or 50% of said polyether compound is bio-based material and 50% of said crystalline polyester compound is bio-based material, or 50% of said polyether compound is bio-based material and 100% of said amorphous polyester compound is bio-based material, or 100% of said polyether compound is bio-based material and 75% of said crystalline polyester compound is bio-based material, or 100% of said polyether compound is bio-based material and 75% of said crystalline polyester compound is bio-based material and 50% of said amorphous polyester compound is bio-based material.

A moisture curable hotmelt adhesive composition according to the present invention has a viscosity from 2000 to 11000 cps, wherein said viscosity is measured according to test method ASTM D3236. A moisture curable hotmelt adhesive composition according to the present invention is a solid at the room temperature and is melted at 110° C. in order to measure the viscosity.

Preferably, application temperature of the moisture curable hotmelt adhesive composition according to the present invention is about 110° C.

The present invention also relates to a cured hotmelt adhesive composition.

The present invention also relates to use of a moisture curable hotmelt adhesive composition according to the present invention as structural adhesives in electronic devices, preferably in cover glass bonding, battery bonding, general module bonding and computer peripherals.

EXAMPLES

Raw materials listed below in the examples are in weight percentages.

Example 1

9.67% propylene glycol polymer (PPG2000 from Dow), 11.0% 1,3-propanedeol polymer (Velvetol H2000 from Allessa), 17.0% polyester polyol (Stepanpol PDP 70 from Stepanpol), 26.0% polyester polyol (Dynacoll 7360 from Evonik) and 21.0% acrylic resin (Dianal MB 2595 from DAI Dianal America Inc) were added to a 1 KG steel vessel. The mixture was melted at 130° C. for 30 minutes, and subsequently stirred under vacuum for 90 minutes at the same temperature. 0.03% 4-toluenesulfonyl isocyanate (pTSI from OMG Borchers) and 0.2% acrylate copolymer (Perenol F40 from BASF) were added and the mixture was stirred for a further 15 minutes under vacuum at 130° C. 14.0% diphenylmethane 4,4-diisocyanate (4,4-MDI from Covestro) was added and the mixture was subsequently stirred for a further 30 minutes under vacuum at 130° C. Finally, 0.5% mercaptopropyltrimethoxysilane (Silquest A189 from Momentive) and 0.6% 2,2-dimorpholinodiethyl ether (DMDEE from Huntsman) were added and the mixture was stirred for a further 15 minutes at 130° C.

Example 4

10.5% Propylene glycol polymer (PPG2000 from Dow), 10.17% 1,3-propanedeol polymer (Velvetol H2000 from Alessa GmbH), 17.0% polyester diol (Priplast 3238 from Croda), 26.0% polyester polyol (Dynacoll 7360 from Evonik) and 21.0% acrylic resin (Dianal MB 2595 from DAI Dianal America Inc) were added to a 1 KG steel vessel. The mixture was melted at 130° C. for 30 minutes, and subsequently stirred under vacuum for 90 minutes at the same temperature. 0.03% 4-toluenesulfonyl isocyanate (pTSI from OMG Borchers) and 0.2% acrylate copolymer (Perenol F40 from BASF) were added and the mixture was stirred for a further 15 minutes under vacuum at 130° C. 14.0% diphenylmethane 4,4-diisocyanate (4,4-MDI from Covestro) was added and the mixture was stirred for a further 30 minutes under vacuum at 130° C. Finally, 0.5% mercaptopropyltrimethoxysilane (Silquest A189 from Momentive) and 0.6% 2,2-dimorpholinodiethyl ether (DMDEE from Huntsman) were added and the mixture was stirred for a further 15 minutes at 130° C.

Remaining examples 2-3 and 5-7 were prepared in the same manner as examples 1 and 4.

Table 1 below lists ingredients for examples 1-7, wherein examples 1-5 contain 11-59% bio-based material, whereas example 6 is completely based on petrol-based material, and example 7 is without adhesion promoter.

TABLE 1

| Component | Example 1 | Example 2 | Example 3 | Example 4 | Example 5 | Example 6 | Example 7 |
|---|---|---|---|---|---|---|---|
| Polyether PPG 2000 | 9.67% | 10.17% | | 10.5% | | 20.67% | |
| Bio-based polyether Velvetol H2000 | 11% | 10.5% | 20.67% | 10.17% | 20.67% | | 20.67% |

TABLE 1-continued

| Component | Example 1 | Example 2 | Example 3 | Example 4 | Example 5 | Example 6 | Example 7 |
|---|---|---|---|---|---|---|---|
| Acrylate resin Dianal MB 2595 | 21% | 21% | 21% | 21% | 21% | 21% | 21% |
| Crystalline polyester Dynacoll 7360 | 26% | 13% | 6% | 26% | | 26% | |
| Crystalline polyester Dynacoll 7380 | | | | | 6% | | 6% |
| Bio-based crystalline polyester Terra 481 | | 13% | 20% | | 20% | | 20% |
| Amorphous polyester Stepanpol PDP 70 | 17% | 17% | 17% | | 8.5% | 17% | |
| Bio-based amorphous polyester Priplast 3238 | | | | 17% | 8.5% | | 17.7% |
| Isocyanate 4,4-MDI | 14% | 14% | 14% | 14% | 14% | 14% | 14% |
| Perenol F40 | 0.2% | 0.2% | 0.2% | 0.2% | 0.2% | 0.2% | 0.2% |
| Dimorpholin odietylether | 0.6% | 0.6% | 0.6% | 0.6% | 0.6% | 0.6% | 0.6% |
| Silquest A189 | 0.5% | 0.5% | 0.5% | 0.5% | 0.5% | 0.5% | 0.5% |
| 4-toluenesulfonyl-isocyanate | 0.03% | 0.03% | 0.03% | 0.03% | 0.03% | 0.03% | 0.03% |
| | 100% | 100% | 100% | 100% | 100% | 100% | 100% |

Three- and six-minutes fixture strengths and 24 h cross tensile strength and 24 h cross tensile strength after two minutes OT were measured to examples 1-7.

Tensile Cross Strength was Measured According to the Following Method:

Lap-shear specimens (stainless steel and polycarbonate) with a width of 25.4 mm and length of 101.6 mm were cleaned with ethanol before use and allowed to dry. Two 127 μm gap spacers were placed on the stainless-steel lap-shear. The distance between each gap spacer and the edge of lap-shear was 3 mm. Two lines (25.4 mm length) of adhesive were applied to the centre of the prepared surface of one lap-shear specimen, and it was made sure the lines are parallel to the lap-shear. The distance between each bead adhesive and the edge of lap-shear was 8 mm. After dispensing adhesive, the mating lap-shear was assembled, and it was made sure the adhesive lines were vertical to the mating lap-shear and on the centre of the mating lap-shear. A 2 KG weight block was placed on top of the mating lap-shear specimen for 15 seconds. The samples were cured for the required time hours at 23° C., 50% relative humidity.

Tensile cross strength and fixture strength are measured on a Zwick at a crosshead speed of 2.0 mm/min. Record the load at failure and the failure mode (adhesive or cohesive failure).

Table 2 below summaries the results of 3 minutes fixture strengths and table 3 summaries the results of 6 minutes fixture strengths. FIG. 1 illustrates three- and six-minutes fixture strength results for example 1-7.

Figure 2:
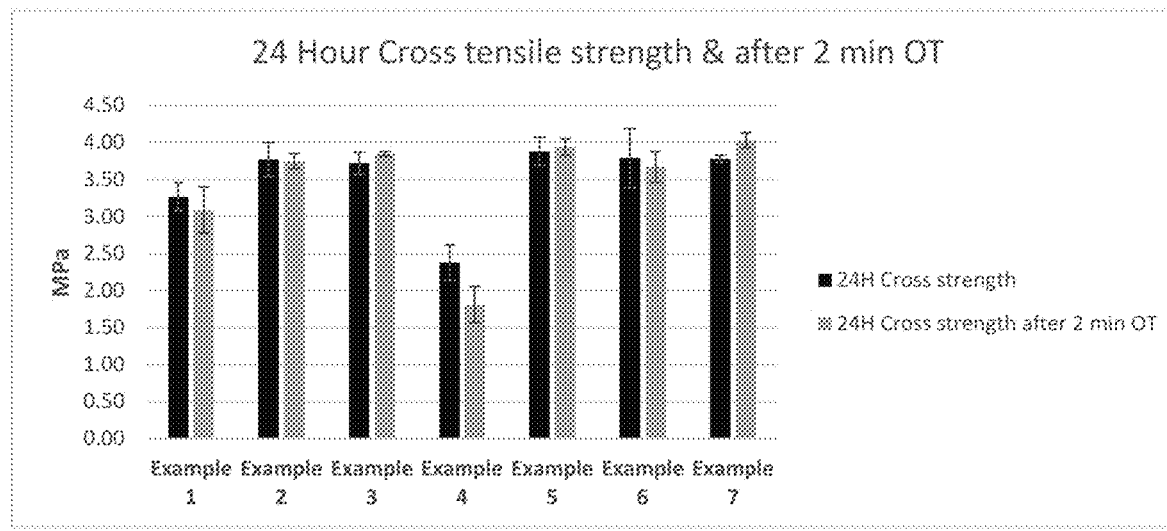
FIG. 2 illustrates 24 h cross tensile strength and 24 h cross tensile strength after two minutes opening time (OT).

Table 4 below summaries the results of 24 h cross tensile strength and table 5 summaries the results of 24 h cross tensile strength after 2 minutes OT. FIG. 2 illustrates of 24 h cross tensile strength and 24 h cross tensile strength after 2 minutes OT results for examples 1-7.

It can be seen from the results, bio-based raw material can be used in the moisture curable hotmelt adhesive composition without losing desired physical properties and performance.

TABLE 2

| 3 min fix | Example 1 | Example 2 | Example 3 | Example 4 | Example 5 | Example 6 | Example 7 |
|---|---|---|---|---|---|---|---|
| 1 | 0.12 | 0.10 | 0.14 | 0.02 | 0.16 | 0.05 | 0.09 |
| 2 | 0.12 | 0.10 | 0.14 | 0.02 | 0.16 | 0.04 | 0.09 |
| 3 | 0.12 | 0.10 | 0.16 | 0.02 | 0.17 | 0.03 | 0.09 |
| Average | 0.12 | 0.10 | 0.15 | 0.02 | 0.16 | 0.04 | 0.09 |
| St. Dev | 0.00 | 0.00 | 0.01 | 0.00 | 0.00 | 0.01 | 0.00 |

TABLE 3

| 6 min fix | Example 1 | Example 2 | Example 3 | Example 4 | Example 5 | Example 6 | Example 7 |
|---|---|---|---|---|---|---|---|
| 1 | 0.45 | 0.17 | 0.37 | 0.27 | 0.39 | 0.27 | 0.30 |
| 2 | 0.34 | 0.12 | 0.39 | 0.26 | 0.48 | 0.23 | 0.28 |
| 3 | 0.47 | 0.13 | 0.40 | 0.24 | 0.38 | 0.24 | 0.25 |
| Average | 0.42 | 0.14 | 0.39 | 0.26 | 0.42 | 0.25 | 0.28 |
| St. Dev | 0.06 | 0.02 | 0.01 | 0.01 | 0.04 | 0.02 | 0.02 |

TABLE 4

| 24 h Cross tensile strength | Example 1 | Example 2 | Example 3 | Example 4 | Example 5 | Example 6 | Example 7 |
|---|---|---|---|---|---|---|---|
| 1 | 3.39 | 4.10 | 3.85 | 2.26 | 4.14 | 3.93 | 3.70 |
| 2 | 3.42 | 3.60 | 3.80 | 2.17 | 3.70 | 4.19 | 3.81 |
| 3 | 3.00 | 3.61 | 3.52 | 2.71 | 3.80 | 3.24 | 3.82 |
| Average | 3.27 | 3.77 | 3.72 | 2.38 | 3.88 | 3.79 | 3.78 |
| St. Dev | 0.19 | 0.23 | 0.15 | 0.24 | 0.19 | 0.40 | 0.05 |

TABLE 5

| 24 H Cross tensile strength | Example 1 | Example 2 | Example 3 | Example 4 | Example 5 | Example 6 | Example 7 |
|---|---|---|---|---|---|---|---|
| 1 | 2.99 | 3.79 | 3.87 | 1.74 | 3.91 | 3.50 | 4.10 |
| 2 | 2.77 | 3.85 | 3.80 | 2.14 | 3.82 | 3.54 | 4.10 |
| 3 | 3.51 | 3.61 | 3.87 | 1.55 | 4.08 | 3.97 | 3.89 |
| Average | 3.09 | 3.75 | 3.85 | 1.81 | 3.94 | 3.67 | 4.03 |
| St. Dev | 0.31 | 0.10 | 0.03 | 0.25 | 0.11 | 0.21 | 0.10 |

Table 6 below lists ingredients for examples 8 and 9, wherein examples contain 20% and 60% bio-based material. Examples 8 and 9 were prepared in the same manner as example 4.

TABLE 6

| Component | Example 8 | Example 9 |
|---|---|---|
| Polyether PPG 2000 | 0 | 10.8 |
| Bio-based polyether Velvetol H2000 | 21.31 | 10.8 |
| Acrylate resin Dianal MB 2595 | 19.753 | 20.19 |
| Crystalline polyester Dynacoll 7360 | 0 | 19.8 |
| Crystalline polyester Dynacoll 7380 | 6 | 6.0 |
| Bio-based crystalline polyester Terra 481 | 20.5 | 0 |
| Amorphous polyester Stepanpol PDP 70 | 0 | 8.53 |
| Bio-based amorphous polyester Priplast 3238 | 18.19 | 9.2 |
| Isocyanate 4,4-MDI | 13.412 | 13.845 |
| Perenol F 40 | 0.2 | 0.2 |
| Dimorpholinodietyether | 0.1 | 0.1 |
| Silquest A189 | 0.5 | 0.5 |
| Tinopal OB CO | 0.005 | 0.005 |
| Additive TI | 0.03 | 0.03 |
|  | 100 | 100 |

Three- and six-minutes fixture strengths and 24 h cross tensile strength and 24 h cross tensile strength after two minutes OT were measured to examples 8 and 9 according to the test methods described above.

Table 7 below summaries the results of 3 minutes fixture strengths and table 8 summaries the results of 6 minutes fixture strengths.

Table 9 below summaries the results of 24 h cross tensile strength and table 10 summaries the results of 24 h cross tensile strength after 2 minutes OT.

TABLE 7

| 3 min fix | Example 8 | Example 9 |
|---|---|---|
| 1 | 0.11 | 0.5 |
| 2 | 0.14 | 0.5 |
| 3 | 0.11 | 0.53 |
| Average | 0.12 | 0.51 |
| St. Dev | 0.02 | 0.02 |

TABLE 8

| 6 min fix | Example 8 | Example 9 |
|---|---|---|
| 1 | 0.28 | 0.58 |
| 2 | 0.22 | 0.57 |
| 3 | 0.23 | 0.56 |
| Average | 0.24 | 0.57 |
| St. Dev | 0.03 | 0.01 |

TABLE 9

| 24 h Cross tensile strength | Example 8 | Example 9 |
|---|---|---|
| 1 | 3.08 | 4.03 |
| 2 | 3.83 | 4.11 |
| 3 | 3.18 | 4.02 |
| Average | 3.36 | 4.05 |
| St. Dev | 0.41 | 0.05 |

TABLE 10

| 24 h Cross tensile strength | Example 8 | Example 9 |
|---|---|---|
| 1 | 3.61 | 4.45 |
| 2 | 3.2 | 4.35 |
| 3 | 3.42 | 3.92 |
| Average | 3.41 | 4.24 |
| St. Dev | 0.21 | 0.28 |

The invention claimed is:

1. A moisture curable hotmelt adhesive composition comprising, based on the total weight of the composition:
at least one polyurethane prepolymer that, in the presence of a catalyst, is the reaction product of:
a) from 18 to 24 wt. % of a polyether component, the polyether component made of one or both of a petrol-based polyether and a bio-based polyether, wherein at least 50 wt. % of the polyether component is the bio-based polyether;
b) from 18 to 24 wt. % of at least one (meth) acrylic resin formed from two or more (meth) acrylate monomers and having a number average molecular weight (Mn) of from 8000 to 30000 g/mol;
c) from 23 to 29 wt. % of a crystalline polyester component, the crystalline polyester component made of one or both of a petrol-based crystalline polyester and a bio-based crystalline polyester;
d) from 14 to 20 wt. % of an amorphous polyester component, the amorphous polyester component made of one or both of a petrol-based amorphous polyester and a bio-based amorphous polyester; and
e) from 11 to 17 wt. % of at least one isocyanate compound,
wherein from 50 to 75 wt. % of the crystalline polyester component is the bio-based crystalline polyester or 50 to 100 wt. % of the amorphous polyester component is the bio-based amorphous polyester.

2. The moisture curable hotmelt adhesive composition of claim 1, wherein the polyether component is from 19 to 23 wt. % based on the total weight of the composition.

3. The moisture curable hotmelt adhesive composition of claim 1, wherein the at least one (meth) acrylic resin is from 19 to 23 wt. % based on the total weight of the composition.

4. The moisture curable hotmelt adhesive composition of claim 1, wherein the crystalline polyester component is from 24 to 28 wt. % based on the total weight of the composition.

5. The moisture curable hotmelt adhesive composition of claim 1, wherein the isocyanate compound is from 12 to 16 wt. % based on the total weight of the composition.

6. The moisture curable hotmelt adhesive composition of claim 1, further comprising an additive selected from the group consisting of adhesion promoters, defoamers, optical brighteners, dispensing agents, pigments, viscosity modifiers, and mixtures thereof.

7. The moisture curable hotmelt adhesive composition of claim 1, wherein:
100 wt. % of the amorphous polyester component is the bio-based amorphous polyester,
100 wt. % of the polyether component is the bio-based polyether and at least 75 wt. % of the crystalline polyester component is the bio-based crystalline polyester, or
100 wt. % of the polyether component is the bio-based polyether and at least 75 wt. % of the crystalline polyester component is the bio-based crystalline polyester and at least 50 wt. % of the amorphous polyester component is the bio-based amorphous polyester.

8. The moisture curable hotmelt adhesive composition of claim 1, wherein the polyurethane prepolymer has a viscosity of from 3000 to 7000 cps, and wherein the viscosity is measured according to test method ASTM D3236.

9. The moisture curable hotmelt adhesive composition of claim 1, wherein the polyurethane prepolymer has a molecular weight (Mn) of from 2000 to 8000, wherein the molecular weight is measured by gel permeation chromatography according to DIN 55672-1:2007-08 with THF as the eluent.

10. The moisture curable hotmelt adhesive composition of claim 1, wherein the composition has a viscosity of from 2000 to 11000 cps, and wherein the viscosity is measured according to test method ASTM D3236.

11. A cured reaction product of the moisture curable hotmelt adhesive composition of claim 1.

12. An electronic device comprising the moisture curable hotmelt adhesive composition of claim 1.

13. The moisture curable hotmelt adhesive composition of claim 1, wherein:
50 to 75 wt. % of the crystalline polyester component is the bio-based crystalline polyester; and
50 to 100 wt. % of the amorphous polyester component is the bio-based amorphous polyester.

14. The moisture curable hotmelt adhesive composition of claim 1, wherein the bio-based amorphous polyester polyol is the reaction product of a dimer fatty acid, a C2-C4 diol, and a C8-C16 dicarboxylic acid or a C6-C12 lactide.

15. The moisture curable hotmelt adhesive composition of claim 1, wherein the bio-based crystalline polyester is a reaction product of decanedioic acid and 1,2-propanediol, or a reaction product of decanedioic acid and 1,4-butanediol, or a reaction product of butanedioic acid and 1,4-butanediol.

16. The moisture curable hotmelt adhesive composition of claim 1, further comprising from 0.1 to 2 wt. % of an adhesion promoter.

17. The moisture curable hotmelt adhesive composition of claim 16, wherein the adhesion promoter is a silane compound.

18. The moisture curable hotmelt adhesive composition of claim 1, further comprising from 0.1 to 2 wt. % of a defoamer.

19. A moisture curable hotmelt adhesive composition comprising, based on the total weight of the composition:
at least one polyurethane prepolymer that, in the presence of a catalyst, is the reaction product of:
a) from 18 to 24 wt. % of a polyether component, the polyether component made of one or both of a petrol-based polyether and a bio-based polyether, wherein at least 50 wt. % of the polyether component is the bio-based polyether;
b) from 18 to 24 wt. % of at least one (meth) acrylic resin formed from two or more (meth) acrylate monomers and having a number average molecular weight (Mn) of from 8000 to 30000 g/mol;

c) from 23 to 29 wt. % of a crystalline polyester component, the crystalline polyester component made of one or both of a petrol-based crystalline polyester and a bio-based crystalline polyester;
d) from 14 to 20 wt. % of an amorphous polyester component, the amorphous crystalline polyester component made of one or both of a petrol-based amorphous polyester and a bio-based amorphous polyester; and
e) from 11 to 17 wt. % of at least one isocyanate compound, wherein:

100 wt. % of the amorphous polyester component is the bio-based amorphous polyester, 100 wt. % of the polyether component is the bio-based polyether and at least 75 wt. % of the crystalline polyester component is the bio-based crystalline polyester, or 100 wt. % of the polyether component is the bio-based polyether and at least 75 wt. % of the crystalline polyester component is the bio-based crystalline polyester and at least 50 wt. % of the amorphous polyester component is the bio-based amorphous polyester.

* * * * *